UNITED STATES PATENT OFFICE.

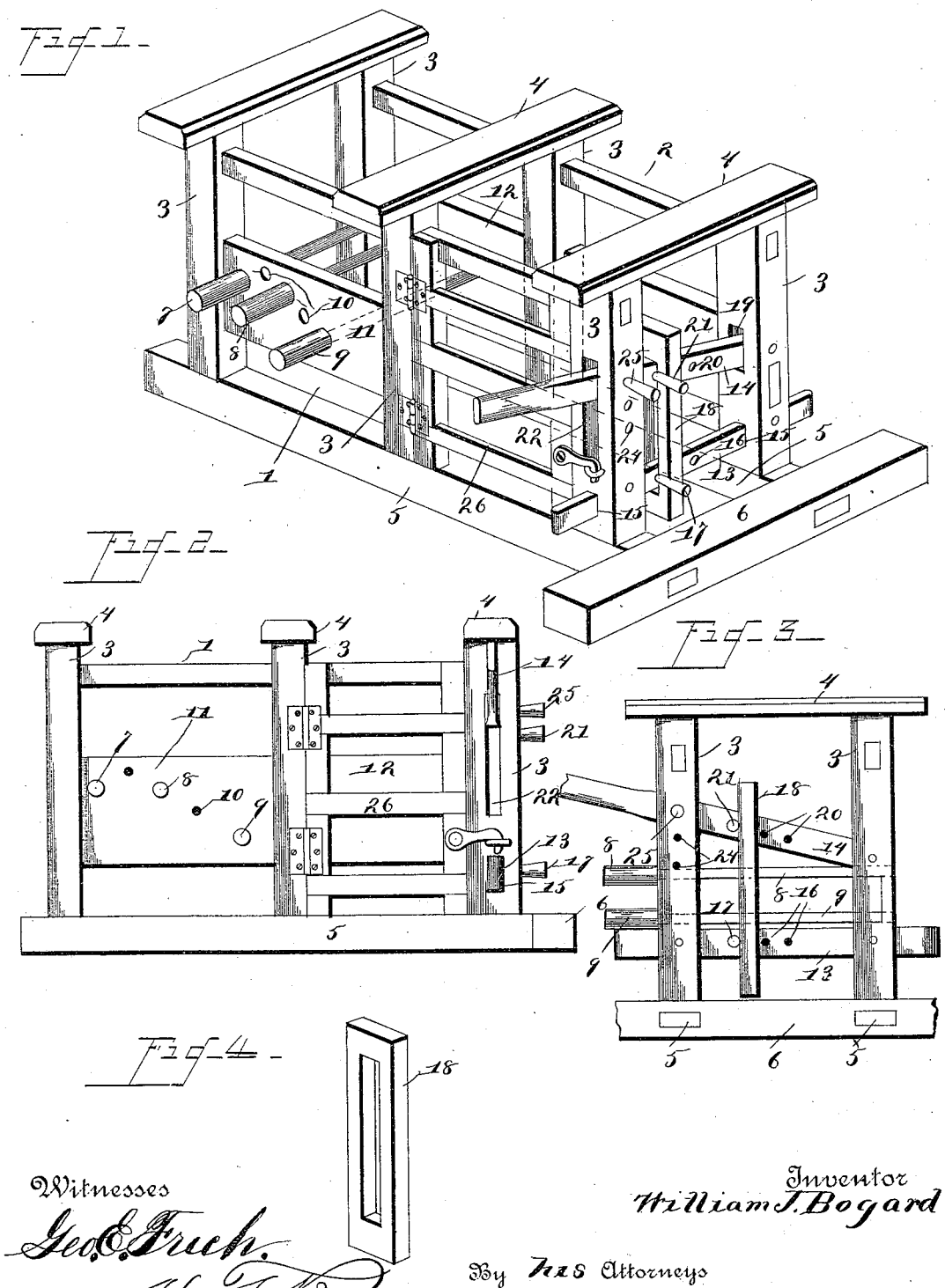

WILLIAM J. BOGARD, OF MENDON, MISSOURI.

STANCHION.

SPECIFICATION forming part of Letters Patent No. 427,145, dated May 6, 1890.

Application filed December 30, 1889. Serial No. 335,310. (No model.)

*To all whom it may concern:*

Be it known that I, WILLIAM J. BOGARD, a citizen of the United States, residing at Mendon, in the county of Chariton and State of Missouri, have invented a new and useful Stanchion, of which the following is a specification.

The invention relates to improvements in stanchions.

The object of the invention is to provide a stanchion of simple and inexpensive construction, adapted to readily receive an animal and hold the same so that it will be under complete control of the operator, and capable of adjustment to suit various animals.

The invention consists in the construction and novel combination and arrangement of parts, hereinafter fully described, illustrated in the accompanying drawings, and pointed out in the claims hereto appended.

In the drawings, Figure 1 is a perspective view of a stanchion constructed in accordance with this invention. Fig. 2 is a side elevation. Fig. 3 is a front elevation. Fig. 4 is a detail view of the sliding loop that confines the head of the animal.

Referring to the accompanying drawings, 1 and 2 designate the sides of a stanchion, which consist of vertical posts 3, that are connected by transverse cross-pieces 4, arranged at the top of the stanchion and securing the sides 1 and 2 together. The posts 3 of each side of the stanchion are connected by a longitudinal beam 5, in which they are stepped, and which forms the foundation or base of the stanchion. The longitudinal beams 5 are parallel with each other, and have their front ends secured preferably by a tenon and mortised joint to a cross-beam 6. The sides 1 and 2 are adapted to receive and retain an animal, and the rear end of the stanchion is normally open to provide an entrance for an animal. The animal is retained therein by adjustable bars 7, 8, and 9, which fit in perforations 10 in central longitudinal side bars 11 and 12. The perforations are arranged at different elevations longitudinally along the side bars, and register with the perforations of the opposite side bar, and the adjustable bar 7, which is inserted in the rearmost perforations, retains the animal in the stanchion, and the adjustable bar 8 is for forcing the animal forward to bring the head of the same between a stationary bar 13 and a lever 14, which confine the same. The adjustable bar 9 is designed to be arranged beneath the body of the animal in the lower perforations to support and prevent the animal falling during the operations of dehorning, branding, and the like.

The stationary bar 13 is secured in suitable transverse openings 15, near the lower ends of the front posts 3 of the sides of the frame, and is provided with perforations 16, in which is adjusted a pin 17, which holds the lower end of a sliding loop 18, that serves to confine the head of an animal. The lever 14 has one end pivoted in a slot 19 in one of the posts 3, and lies in the same plane as the vertical bar, and has a series of perforations 20, in which is adjusted a pin 21, which holds the upper end of the sliding loop 18. The free end of the lever 14 moves vertically in a longitudinal slot 22 in one of the posts 3, which is provided with a series of perforations 24 and a pin 25 to hold the lever any desired distance from the stationary bar and securely retain the head of an animal. The animal enters the rear open end of the stanchion and is forced forward until its head projects through the opening between the stationary bar 13 and the lever 14, and then the lever is lowered sufficiently to confine the head of the animal and prevent withdrawal of the same, and is maintained in that position by the pin 25. The head of the animal is more closely confined and held perfectly stationary by the sliding loop 18, which is moved on the bar 13 and the lever 14, and adjusted as close as desired to the neck of an animal and is retained in that position by the pins 17 and 21.

The side 1 of the frame of the stanchion is provided with a door 26, which is hung upon suitable hinges and provided with a latch, and allows the operator to enter the stanchion and examine the animal.

From the foregoing it will readily be seen that the stanchion is simple and inexpensive in construction and is capable of securely holding an animal while undergoing the operation of branding, dehorning, or the like.

Having thus described my invention, I claim—

1. A stanchion comprising the sides 1 and 2, provided with a series of perforations 10, the adjustable bars arranged in said perforations, the stationary bar arranged at the front of the stanchion near the bottom thereof, the lever pivoted above the stationary bar, and the loop sliding upon the stationary bar and the lever and adapted to confine the head of an animal, substantially as described.

2. A stanchion comprising the sides 1 and 2, having their end posts 3 provided with a slot 19 and the longitudinal slot 22, the stationary bar arranged near the bottom of said posts and provided with a series of perforations 16, the lever pivoted in the slot 19 and moving vertically in the slot 22 and provided with perforations 20, the loop sliding on the stationary bar and the lever, and the pins for retaining the loop in any desired position, substantially as described.

3. A stanchion comprising the sides 1 and 2, provided near their rear ends with a series of registering perforations 10, arranged at different elevations, and having their front posts provided with slots 19 and 22 and perforations 24, one of said sides having a suitable door 26, the adjustable bars 7, 8, and 9, fitting in said perforations 10, the stationary perforated bar, the lever 14, pivoted in the slot 19 above the stationary bar and having its free end moving vertically in the slot 22 and provided with perforations 20, the loop sliding on the stationary bar and the lever, and the pins for confining the loop and the lever, substantially as and for the purpose described.

In testimony that I claim the foregoing as my own I have hereto affixed my signature in presence of two witnesses.

WILLIAM J. BOGARD.

Witnesses:
I. M. HERNDON,
S. P. LOGAN.